United States Patent
Seki

(10) Patent No.: US 9,129,368 B2
(45) Date of Patent: Sep. 8, 2015

(54) THERMAL IMAGE SMOOTHING METHOD, SURFACE TEMPERATURE-MEASURING METHOD, AND SURFACE TEMPERATURE-MEASURING DEVICE

(75) Inventor: Kento Seki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 50 days.

(21) Appl. No.: 14/009,605

(22) PCT Filed: Apr. 6, 2011

(86) PCT No.: PCT/JP2011/058693
§ 371 (c)(1),
(2), (4) Date: Oct. 3, 2013

(87) PCT Pub. No.: WO2012/137316
PCT Pub. Date: Oct. 11, 2012

(65) Prior Publication Data
US 2014/0016855 A1    Jan. 16, 2014

(51) Int. Cl.
*G06T 5/00* (2006.01)
*G01J 5/00* (2006.01)

(52) U.S. Cl.
CPC ............... *G06T 5/002* (2013.01); *G01J 5/0003* (2013.01); *G01J 2005/0048* (2013.01); *G01J 2005/0077* (2013.01); *G01J 2005/0081* (2013.01); *G06T 2207/10048* (2013.01); *G06T 2207/30136* (2013.01)

(58) Field of Classification Search
CPC ............... G06T 2207/30164; G06T 7/0004; G06T 3/4007; G06K 9/6203
USPC .................................. 382/152, 216, 278, 300
See application file for complete search history.

(56) References Cited

U.S. PATENT DOCUMENTS

| 7,029,172 B2 * | 4/2006 | Jones et al. .................... 374/137 |
| 2004/0218661 A1 | 11/2004 | Jones et al. |
| 2006/0222237 A1 * | 10/2006 | Du et al. ........................ 382/152 |

FOREIGN PATENT DOCUMENTS

| JP | A-61-179881 | 8/1986 |
| JP | A-10-62257 | 3/1998 |
| JP | A-2001-249052 | 9/2001 |
| JP | A-2003-248812 | 9/2003 |
| JP | A-2003-294533 | 10/2003 |
| JP | A-2004-533617 | 11/2004 |
| JP | A-2007-22651 | 2/2007 |
| JP | A-2007-256099 | 10/2007 |

* cited by examiner

*Primary Examiner* — Ruiping Li
(74) *Attorney, Agent, or Firm* — Oliff PLC

(57) ABSTRACT

The thermal image smoothing method, which is a method for smoothing thermal images produced on the basis of thermal image values measured with a work that has been coated with a black body coating, is provided with a removal process wherein estimated thermal image values are set as values on respective line segments between maximum points and thermal image values that are smaller than the estimated thermal image values are removed from the thermal image values as anomalous thermal image values.

12 Claims, 9 Drawing Sheets

(a)

(b)

(a)

crack — black body coating
work (b)

linear pattern caused by crack — thermal image

THERMAL IMAGE SMOOTHING METHOD, SURFACE TEMPERATURE-MEASURING METHOD, AND SURFACE TEMPERATURE-MEASURING DEVICE

TECHNICAL FIELD

The present invention relates to a method for smoothing a thermal image, and a method and apparatus for measuring a surface temperature, and more specifically to a technique of improving accuracy for processing values of the thermal image during the measurement of the surface temperature of an object.

BACKGROUND ART

Conventionally, as a method for measuring a surface temperature of an object such as a steel plate having a flat or curved shape, a contactless measuring method is well known. For an apparatus for use of such method for contactlessly measuring the surface temperature, there are surface-temperature measuring apparatuses, for example, an infrared thermography which detects infrared light emitted from the object.

The measuring accuracy for the temperature distribution of the surface of the object measured by the infrared thermography varies in response to the emissivity of the surface of the object. In detail, even under the condition that all of the object surface have the same temperature, if the emissivity of the object varies in the imaging area, there is a variation in the amount of the infrared light emitted from the surface of the object. That is, the amount of the infrared light detected by the infrared thermography is different in response to the emissivity, and therefore it is difficult to accurately measure the surface-temperature distribution.

For instance, a black body coating is applied on the surface of the object so as to make the emissivity constant (because the emissivity of the black body coating is nearly equal to 1), thereby reducing the influence of the variation in the emissivity (e.g., see PTL 1 to PTL 3).

Though the surface of the object is coated by the black body coating as the Patent Literatures, in the case that a material of the object has high coefficient of thermal expansion or that the heating/cooling process of the system is quick, the film of the black body coating may have cracks as shown in FIG. 8(a) caused by the thermal deformation (thermal expansion or thermal shrink) of the object. In such case, the thermal image that is produced based on the thermal image values of the object involves linear patterns caused by the cracks as shown in FIG. 8(b), because the emissivity on the crack section of the black body coating is lowered. As mentioned, the cracks unfortunately occurred in the film of the black body coating make the accuracy of generating the thermal image lowered.

Conventionally, for the case that the cracks occur in the film of the black body coating, there is a technique of smoothing the thermal image produced based on the values in the thermal image of the object (e.g., see PTL 4). In the Patent Literature, the smoothing for the thermal image is carried out by using averaging of the values.

In an alternative technique of smoothing, unexpected values caused by internal noise of a sensor are removed by comparing values around the unexpected value, and the removed values are interpolated by the average of the around values (e.g., see PTL 5).

In smoothing the values of the thermal image, it is preferable to eliminate fallings of the value caused by the cracks from the temperature profile data (L1) of the values of the thermal image, which is shown in FIG. 9 as a solid line, and to obtain a smoothed data (L2) showing substantially envelope of the values of the thermal image, which is shown in FIG. 9 as a dotted line. However, in the case where the smoothing is performed as PTL 4, the influence of the lowered values of the thermal image in the cracked areas cannot be eliminated, so that a smoothed data (L3) wherein the values of the thermal image have local falling, which is shown as a chain line in FIG. 9, is obtained. Therefore, it is difficult to accurately measure the surface-temperature distribution.

The technique of PTL 5 is related to removing the internal noise of the sensor, so that the unexpected values are produced in a different way. As a result, it is difficult to apply such technique to remove the influence on the thermal image caused by the cracks occurred in the film of the black body coating.

CITATION LIST

Patent Literature

PTL 1: JP 2003-294533 A
PTL 2: JP 2007-256099 A
PTL 3: JP S61-179881 A
PTL 4: JP 2001-249052 A
PTL 5: JP 2007-22651 A

SUMMARY OF INVENTION

Technical Problem

The purpose of the present invention is to provide a method for smoothing a thermal image and a method and apparatus for measuring a surface temperature enabled to measure accurately the surface-temperature distribution of an object even if cracks occur in a film of a black body coating by means of eliminating an influence of the cracks where the amount of infrared light is lowered and smoothing properly the thermal image produced based on the values of the thermal image of the object.

Technical Solutions

The technical problems to be solved are mentioned above, and the technical solutions are described below.

The first aspect of the invention is a method for smoothing a thermal image produced based on thermal image values of a work to be measured on which a black body coating is applied, and the method includes a removal step for removing thermal image values which are smaller than an estimated value from the thermal image values of the work as unexpected values.

In the second aspect of the invention, the removal step includes: a first selection step for selecting maximum points from the thermal image values; a second selection step for selecting additional points having bigger thermal image values than the estimated value, which is set on a line between each two of the adjacent maximum points selected in the first selection step; and an interpolation step for performing a linear interpolation using the maximum points selected in the first selection step and the additional points selected in the second selection step.

In the third aspect of the invention, the removal step is repeated.

In the fourth aspect of the invention, the thermal image values are sorted to row data and column data based on a position in the work, and the thermal image values in the row data and in the column data are used in the removal step.

The fifth aspect of the invention is a method for measuring a surface temperature including the method for smoothing the thermal image according to any one of the first aspect to fourth aspect of the invention.

The sixth aspect of the invention is an apparatus for measuring a surface temperature comprising a processor for carrying out the method according to any one of the first aspect to fourth aspect of the invention.

Advantageous Effects of Invention

Advantageous effects of invention are described below.

According to the invention, even if the cracks occur in the film of the black body coating, the influence by lowering the infrared light in the cracks is eliminated, and the thermal image produced based on the thermal image values of the work to be measured is properly smoothed, thereby providing an accurate measurement of the surface temperature of the work.

DESCRIPTION OF EMBODIMENTS

The embodiment for carrying out the present invention is described below.

It should be noted that the scope of the invention is not limited to the embodiment but broadly contains the whole technical idea that is disclosed in the following description.

Figure 1:
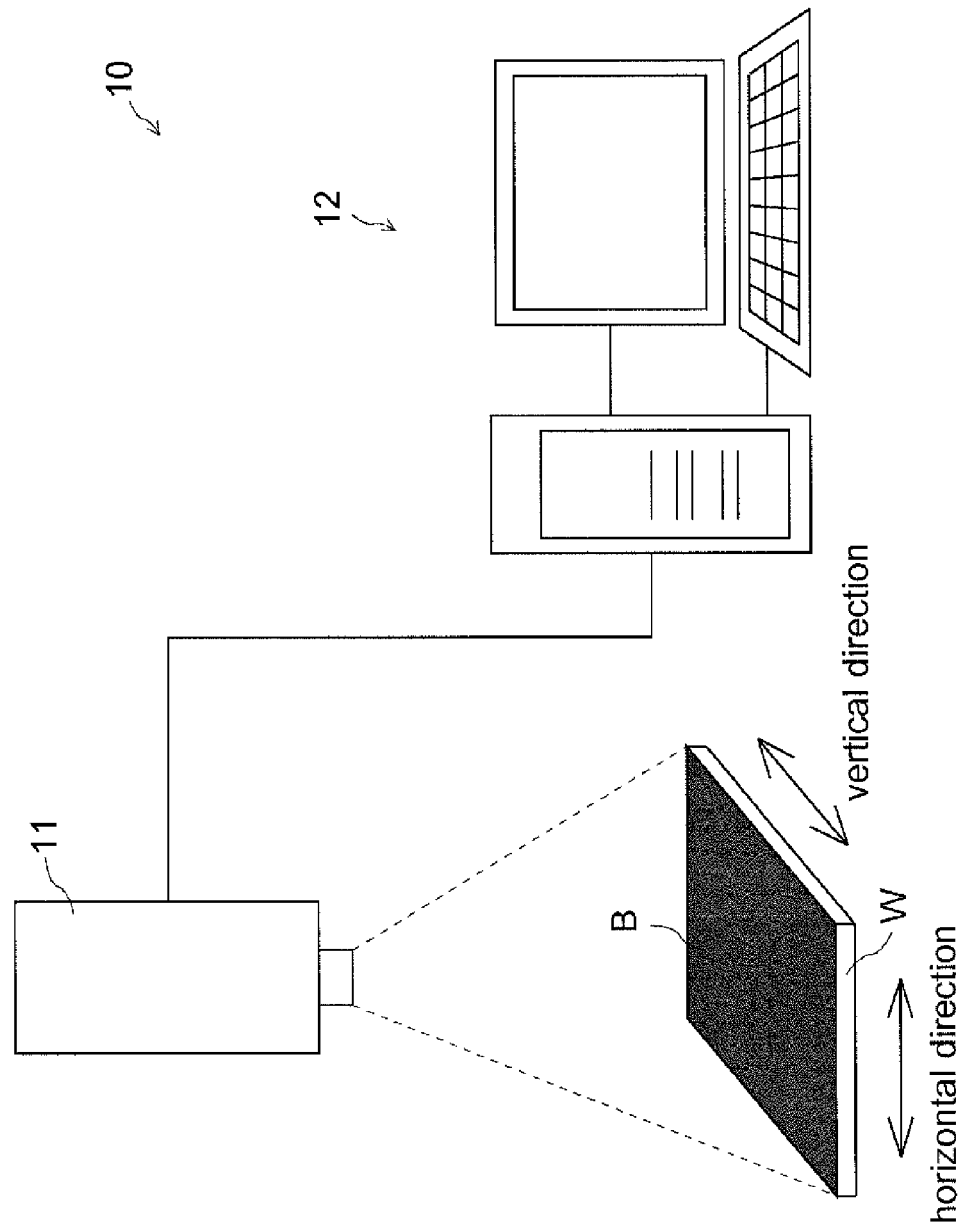
FIG. 1 illustrates a surface-temperature measuring apparatus.

FIG. 1 depicts a surface-temperature measuring apparatus 10 carrying out methods for smoothing a thermal image and for measuring a surface temperature according to the present invention.

As illustrated in FIG. 1, the surface-temperature measuring apparatus 10 is configured as an infrared thermography for measuring a surface temperature of a work W, for example, a steel plate or the like. The surface-temperature measuring apparatus 10 includes an infrared camera 11 and a controller 12. The work W is an object to be measured, and has a measurement surface that is coated by a black body coating B (of which the emissivity is nearly equal 1) in order to equalize the emissivity of the surface and prevent an influence caused by a variation of emissivity. In the embodiment, as shown in FIG. 1, the left-right direction of the work W is defined as a horizontal direction, and the depth direction of the work W is defined as a vertical direction. The horizontal direction is perpendicular to the vertical direction.

The infrared camera 11 has a detection element and a filter (not shown), in which the detection element detects, through the filter, strength (distribution) of infrared light emitted from the work W where the black body coating B is applied.

The controller 12 includes an input device, a display, storage, a communication device and a processor for carrying out a method of smoothing a thermal image, and for example, is configured as a microcomputer containing a CPU, a RAM, a ROM and an interface. As shown in FIG. 1, the controller 12 is electrically connected to the infrared camera 11.

The controller 12 receives the strength of the infrared light of the work W detected by the infrared camera 11 and generates thermal image values of the work W. In other words, the controller receives, or obtains, information of the strength of the infrared light emitted from a measurement surface of the work W detected by the infrared camera 11 and of a distribution of the strength of the infrared light in each of wavelengths thereof emitted from the surface of the work W.

The controller 12 also controls the action of the infrared camera 11. The controller 12 is connected to the infrared camera 11 and transmits an action signal to actuate the infrared camera 11.

Figure 2:
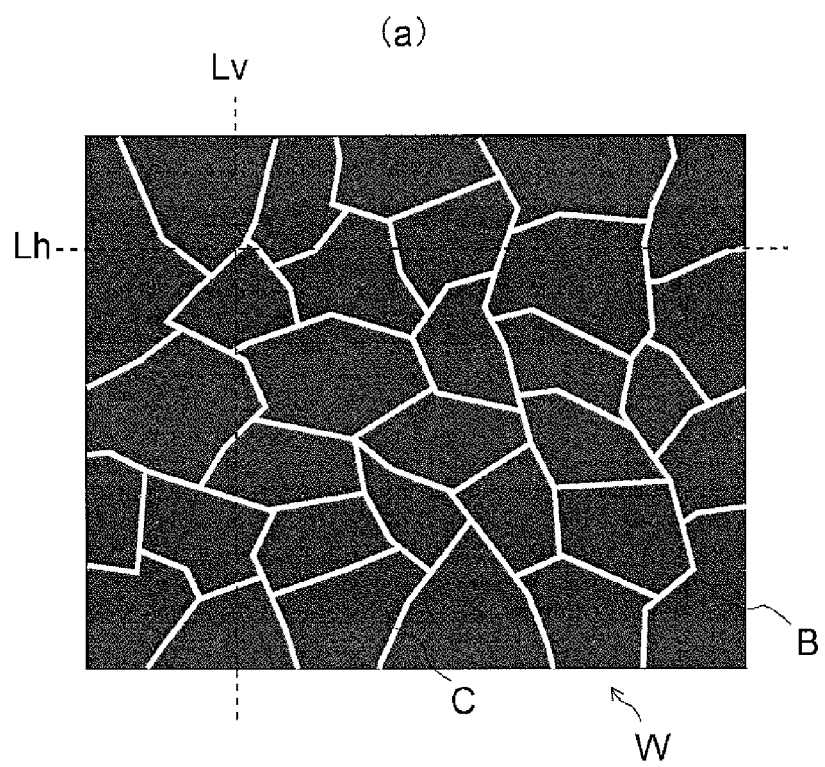
FIG. 2(a) is a flat view of a work to be measured.
FIG. 2(b) depicts a thermal image of the work.
Figure 2:
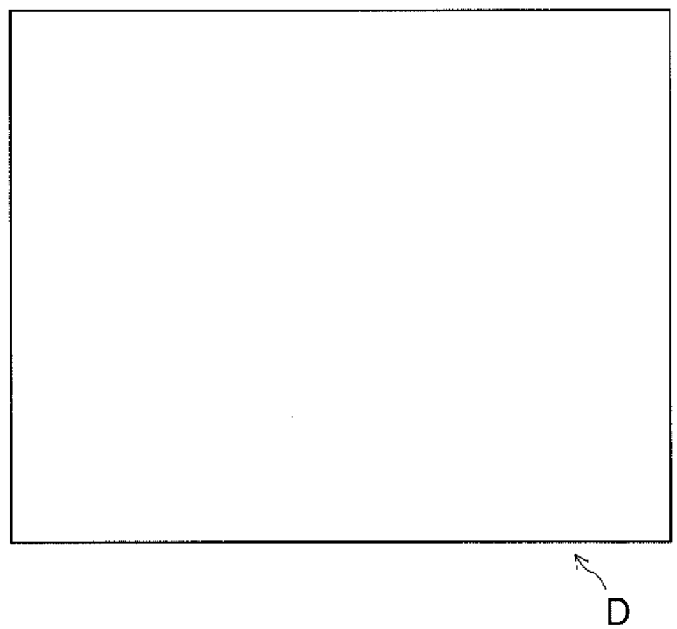

Referring to FIG. 2, the work W as the measurement object, for which the controller 12 generates the thermal image values, is described. As illustrated in FIG. 2(a), the embodiment shows the situation that the work W has a film of the black body coating B in which cracks C occur and the distribution of the surface temperature of the work is measured.

As described above, the infrared camera 11 uses the detection element for detecting the strength of the infrared light of the work W with which the black body coating B is coated. The controller 12 receives the strength of the infrared light of the work W detected by the infrared camera 11, and produces the thermal image of the work W. As illustrated in FIG. 2(a), multiple (e.g., several tens of or several hundreds of) horizontal lines Lh are set with predetermined intervals, and processing including a smoothing process is performed to temperature profile data of the thermal image values on each horizontal line Lh.

Referring to FIGS. 3 through 7, a process for smoothing the temperature profile data of the values in the thermal image carried out in the processor of the controller 12 is described below.

Figure 4:
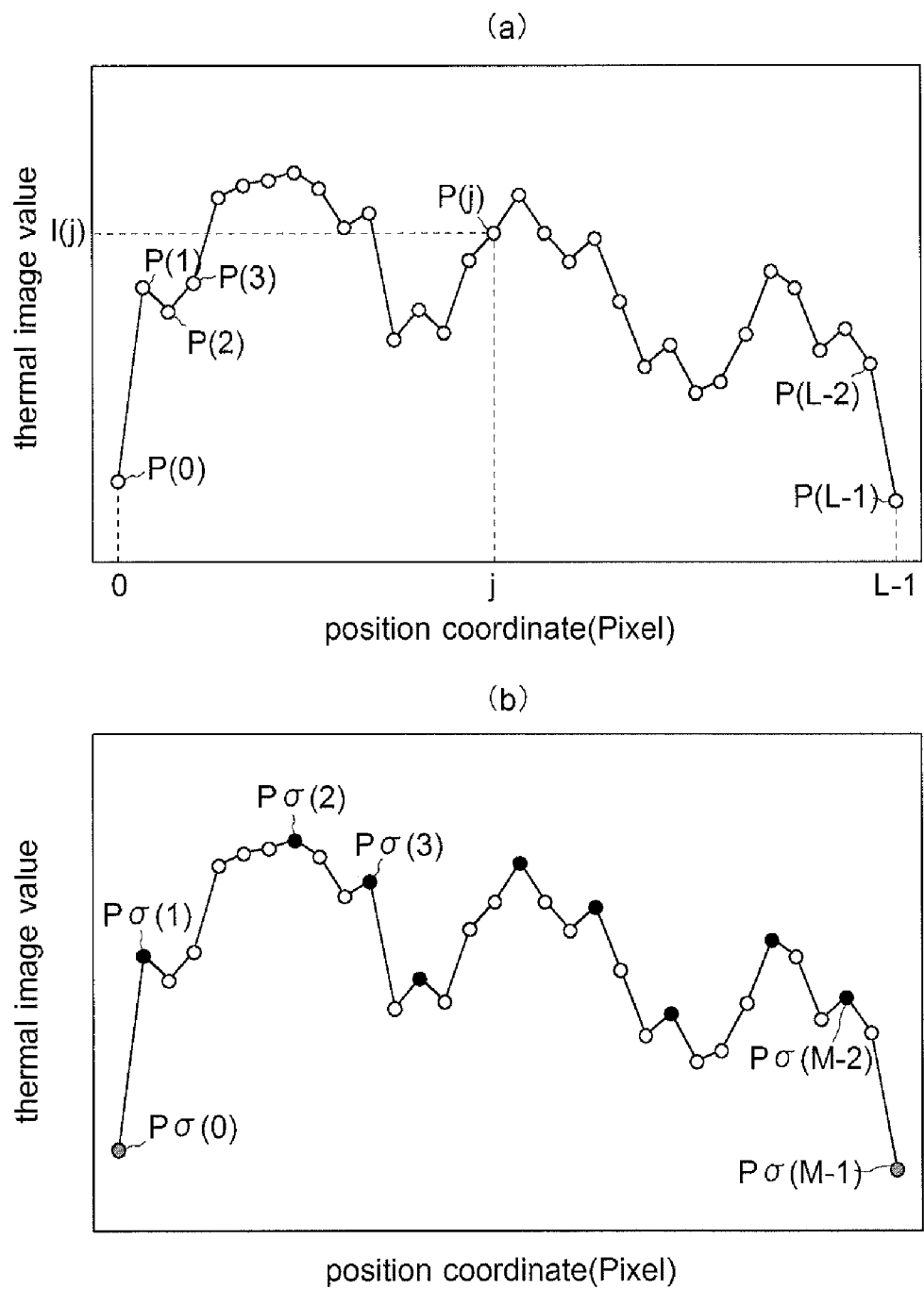
FIG. 4(a) shows a relationship between the position coordinates and the thermal image values in a first smoothing process.
FIG. 4(b) shows maximum points.
Figure 5:
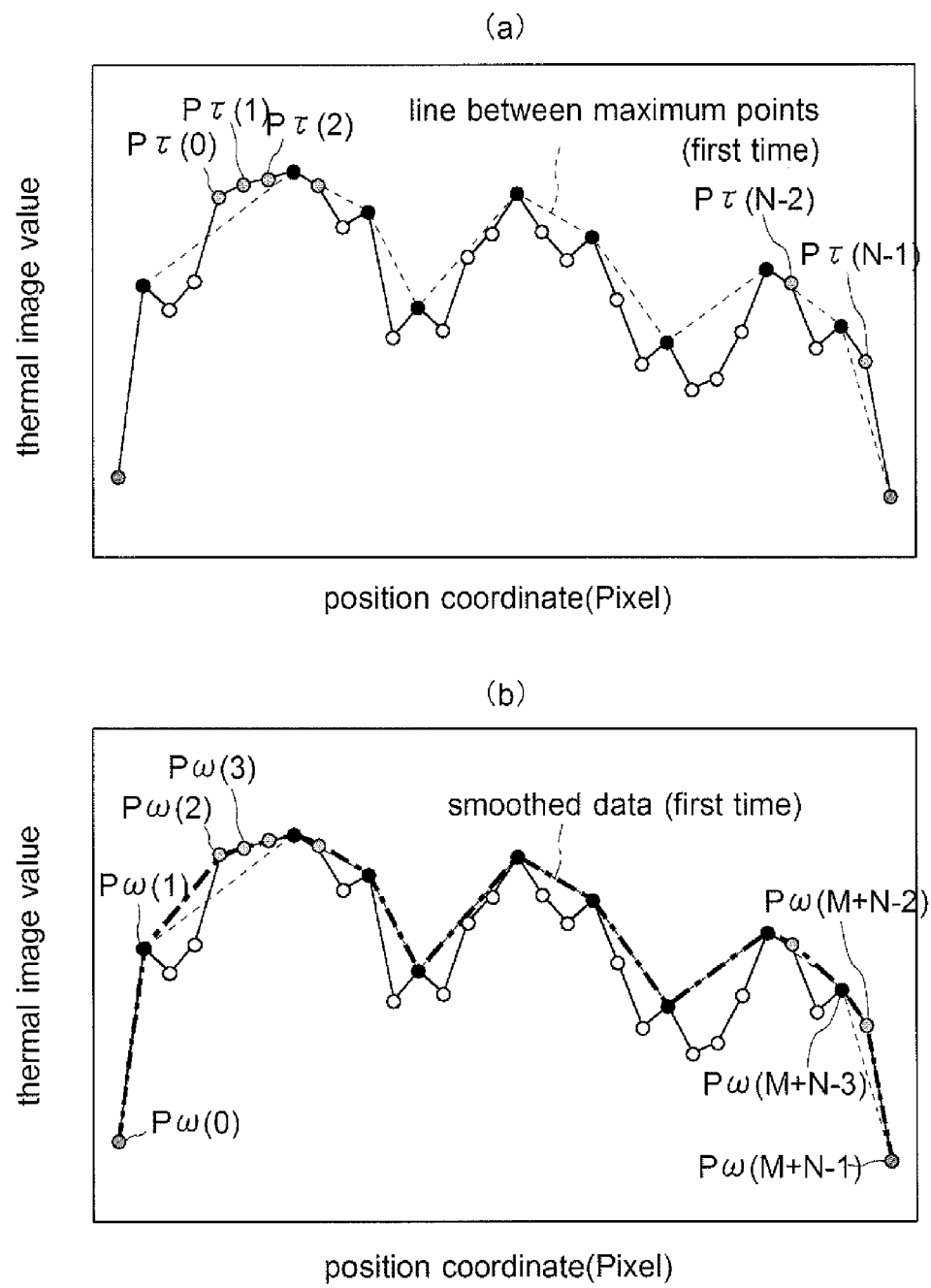
FIG. 5(a) shows the maximum points and additional points.
FIG. 5(b) shows selected points set.
Figure 6:
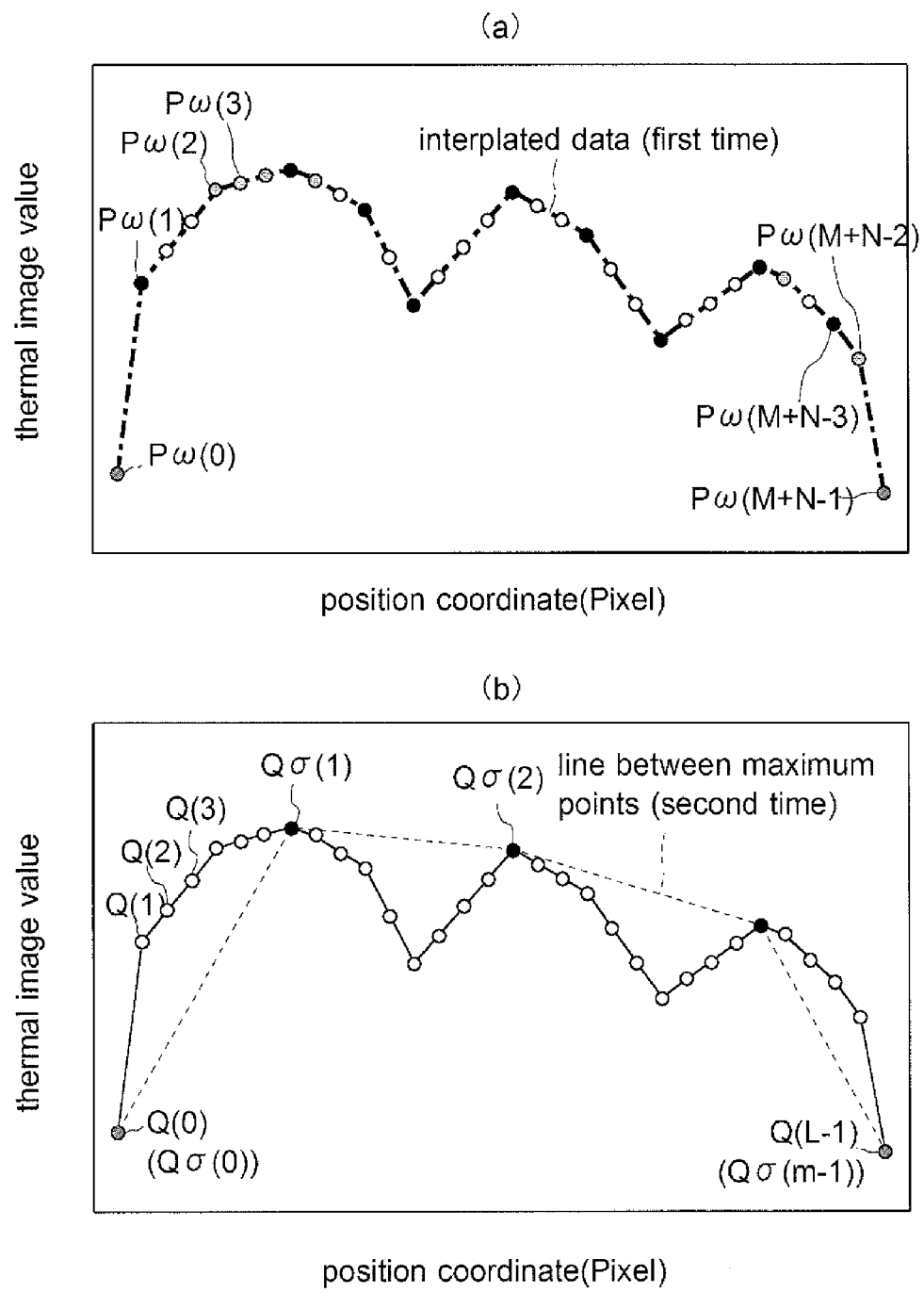
FIG. 6(a) shows data series after a linear interpolation.
FIG. 6(b) shows maximum points and additional points in a second smoothing process.
Figure 7:
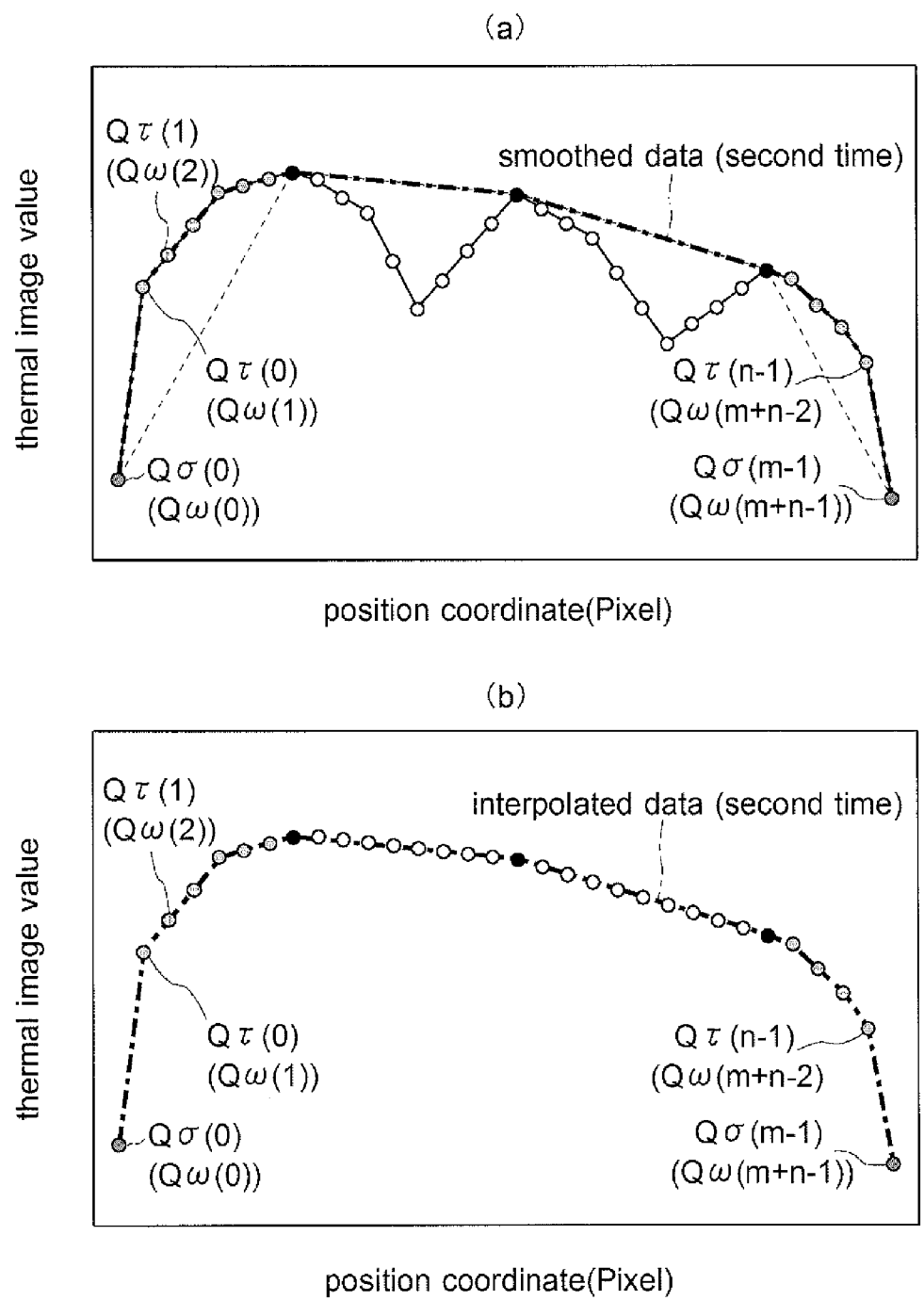
FIG. 7(a) shows selected points set.
FIG. 7(h) shows data series after a linear interpolation.
Figure 8:
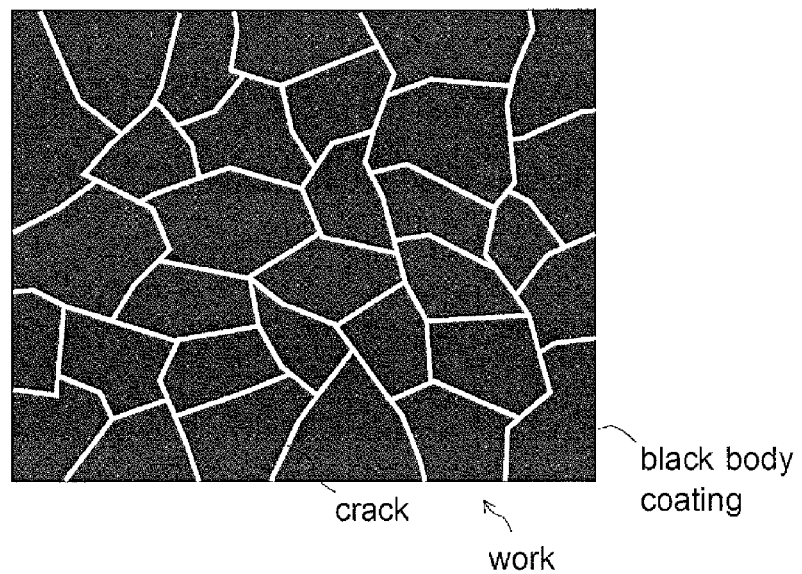
FIG. 8 shows a relationship between a work to be measured and a thermal image in a conventional technique.
Figure 8:
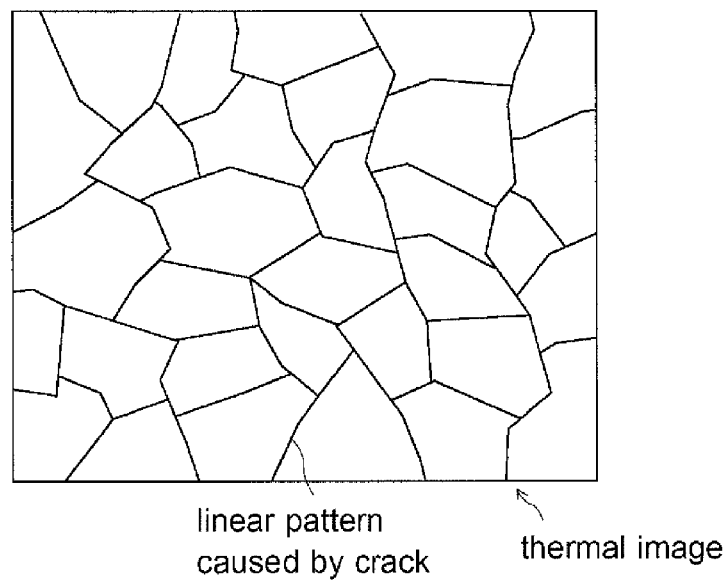
Figure 9:
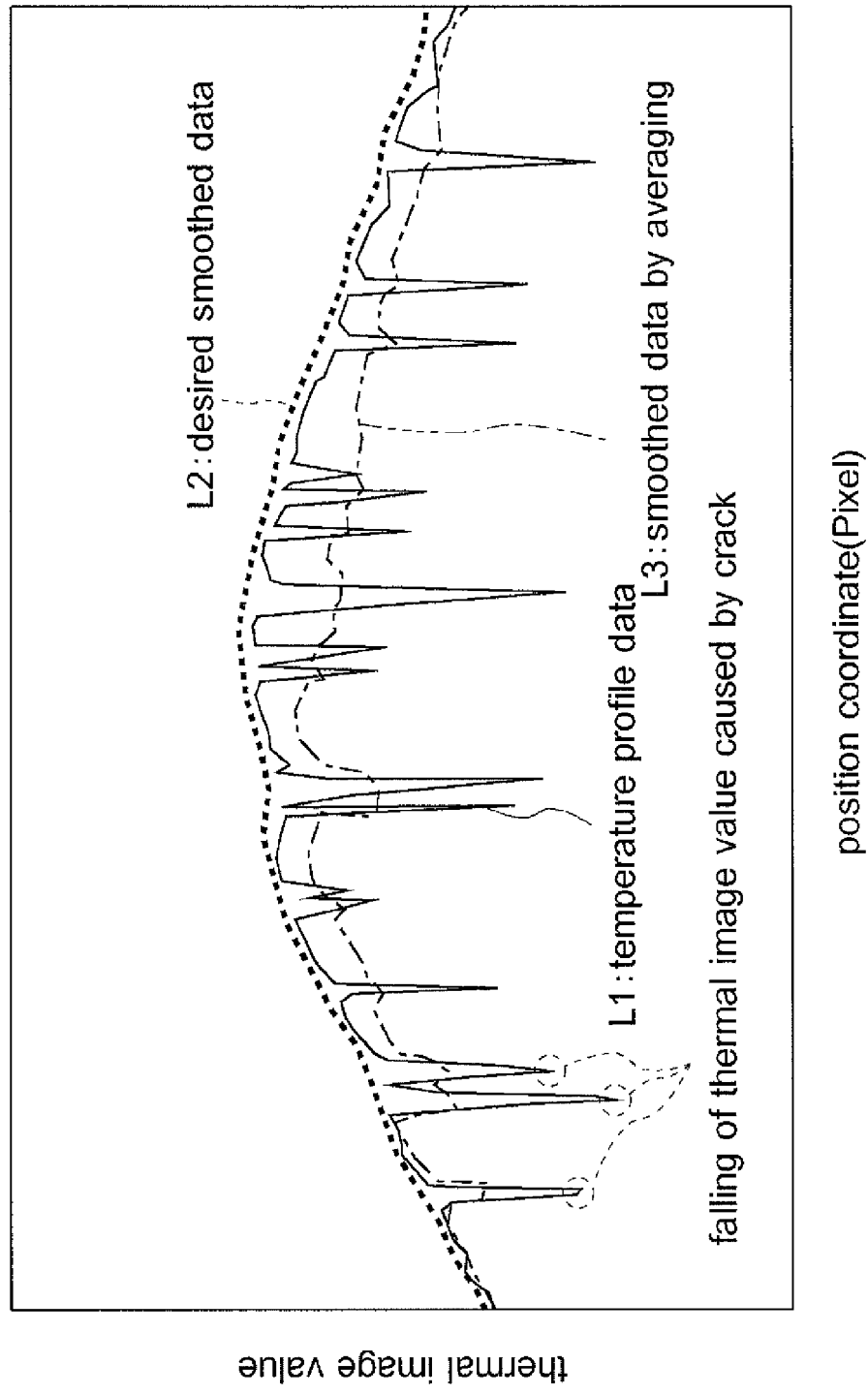
FIG. 9 shows a relationship between the position coordinates and the thermal image values in a conventional technique.

FIGS. 4 ((a) and (b)) through 7((a) and (b)) show, as one example, temperature profile data of the values in the thermal image on one horizontal line Lh selected from the temperature profile data of the thermal image along the multiple horizontal lines Lh. In FIGS. 4 ((a) and (b)) through 7((a) and (b)), the horizontal axes represent the position coordinate j in the horizontal direction and the vertical axes represent the thermal image As shown in FIG. 4(a), the data in the position j is defined as a point P(j), and the value of the thermal image at the point P(j) is defined as a value I(j). In the embodiment, the series of data in the temperature profile data of the thermal image values are represented by L data including P(0) to P(L−1). So, the smoothing process is performed to the series of the thermal image values are represented by the L data including P(0) to P(L−1).

The method for smoothing the thermal image carried out in the embodiment includes a removal step wherein an expected value is set, and the thermal image value smaller than the expected value is removed from the thermal image values as an unexpected value. The removal step includes a first selection step, a second selection step and an interpolation step. These steps are specifically described below.

In the first selection step, the maximum point is selected from the data series as shown in STEPS S01 to S07 as follows.

Figure 3:
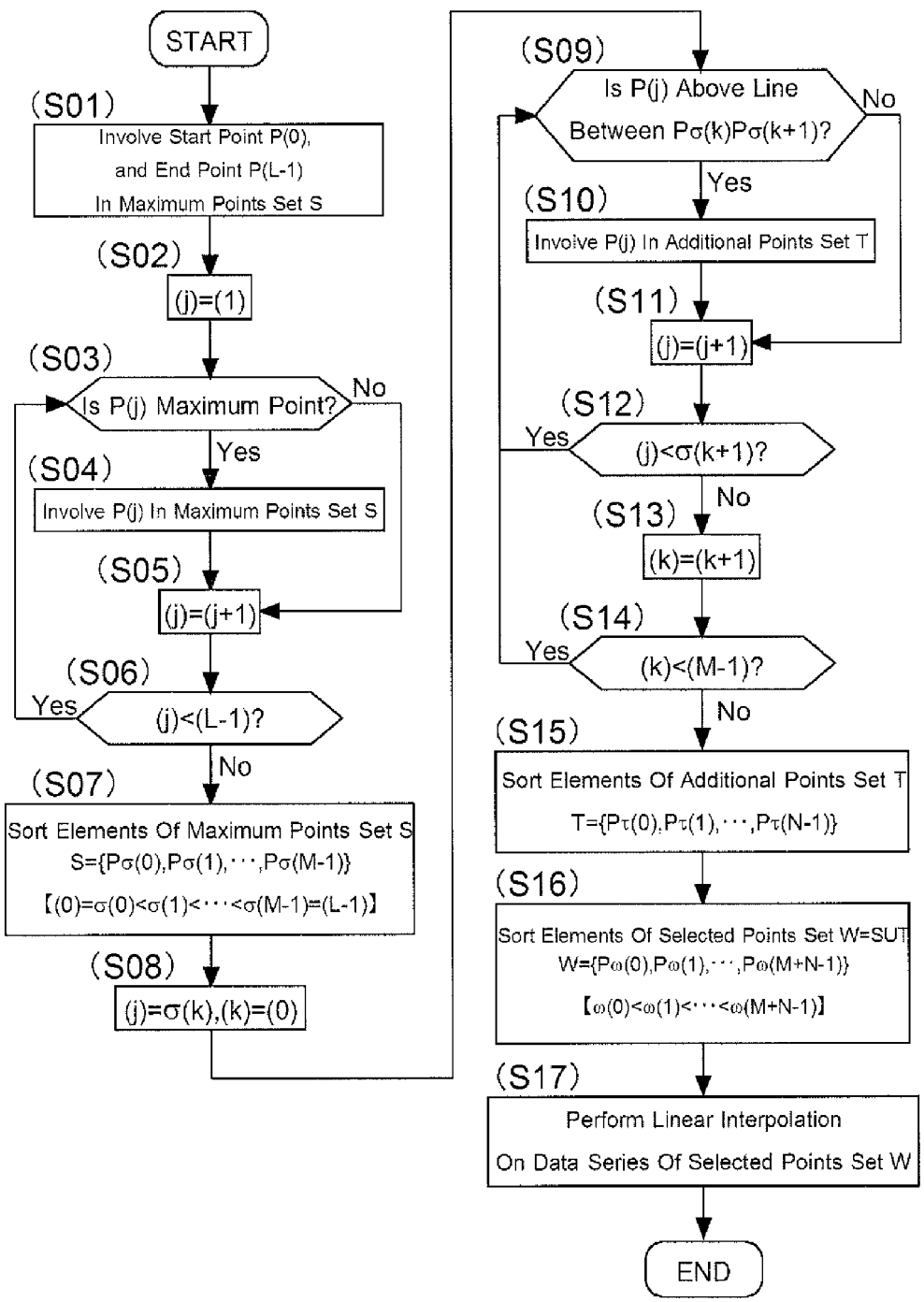
FIG. 3 is a flowchart of a method for smoothing the thermal image.

As shown in STEP S01 in FIG. 3, the start point $P(0)$ as the minimum position coordinate j and the end point $P(L-1)$ as the maximum position coordinate j are involved in a maximum points set S. The maximum points set S is a set involving the start point $P(0)$, the end point $P(L-1)$ and the point where the thermal image value is bigger than those of the adjacent points. The wording that the point where the thermal image value is bigger than those of the adjacent points is the point $P(j)$ satisfying the following conditions: $I(j-1)<I(j)>I(j+1)$.

In the STEP S02, the position coordinate j is set 1 $((j)=(1))$.

In the STEP S03, whether the point $P(j)$ is the maximum point or not is determined. If the point $P(j)$ is the maximum point, the process proceeds to the STEP S04, in which the point $P(j)$ is involved in the maximum points set S, and followed by STEP S05. If the point $P(j)$ is not the maximum point, the process proceeds to the STEP S05, and the position coordinate j is substituted by j+1 $((j)=(j+1))$.

In the STEP S06, whether the position coordinate j is smaller than L-1 $((j)<(L-1))$ or not, i.e., whether the point $P(j)$ is not the same as the end point $P(L-1)$ or not is determined. If the point $P(j)$ is not the same as the end point $P(L-1)$, the process returns to the STEP S03 and repeats the STEP S03 to the STEP S06.

If the point $P(j)$ is the same as the end point $P(L-1)$, the process proceeds to the STEP S07, and the start point $P(0)$, all of the points $P(j)$ that are involved in the maximum points set S in the STEP S03, and the end point $P(L-1)$ are sorted in order. More specifically, the elements in the maximum points set S are set as a point $P\sigma(0)$, a point $P\sigma(1)$, . . . a point $P\sigma(M-1)$ in order. The maximum points set S is defined as a data series including M data, from point $P\sigma(0)$ to point $P\sigma(M-1)$. As shown in FIG. 4(b), the start point $P(0)$ is the same as the point $P\sigma(0)$, and the end point $P(L-1)$ is the same as the point $P\sigma(M-1)$, and the maximum points between the start and end points are reset as the point $P\sigma(1)$ to the point $P\sigma(M-2)$.

In the second selection step, estimated thermal image values are set as values on lines formed between the adjacent maximum points $P\sigma(0)$, $P\sigma(1)$ to the point $P\sigma(M-1)$, and additional points having bigger thermal image values than the estimated thermal image values are selected from the data series as shown in STEPS S08 to S15 as follows.

In the STEP S08, the maximum position coordinate (j) is set as $\sigma(k)$, in which k is set as zero $((j)=\sigma(k), (k)=(0))$.

In the STEP S09, it is determined whether the point $P(j)$ is above the line between the maximum points $P\sigma(k)$ and $P\sigma(k+1)$. If the point $P(j)$ is above the line between the maximum points $P\sigma(k)$ and $P\sigma(k+1)$, the process proceeds to the STEP S10, in which the point $P(j)$ is involved in an additional points set T, followed by the STEP S11. The additional points set T is a set involving the point $P(j)$ having bigger thermal image value $I(j)$ than the estimated thermal image value that is a thermal image value in the position coordinate j on the line between the maximum points $P\sigma(k)$ and $P\sigma(k+1)$. If there is no point $P(j)$ above the line between the maximum points $P\sigma(k)$ and $P\sigma(k+1)$, the process proceeds to the STEP S11, and the position coordinate j is substituted by j+1 $((j)=(j+1))$.

In the STEP S12, whether the position coordinate j is smaller than $\sigma(k+1)$ $((j)<\sigma(k+1))$ or not, i.e., whether the point $P(j)$ is not the same as the next maximum point or not is determined. If the point $P(j)$ is not the same as the next maximum point, the process returns to the STEP S09 and repeats the STEP S09 to the STEP S11. If the point $P(j)$ is the same as the the next maximum point, the process proceeds to the STEP S13, and the value k is substituted by k+1 $((k)=(k+1))$.

In the STEP S14, whether the value k is smaller than the number $M-1((k)<(M-1))$ or not, i.e., whether the point $P(j)$ is not same as the last maximum point $P\sigma(M-1)$ or not is determined. If the point $P(j)$ is not same as the last maximum point $P\sigma(M-1)$, the process returns to the STEP S09 and repeats the STEP S09 to the STEP S13.

If the point PG) is same as the last maximum point $Pa(M-1)$, the process proceeds to the STEP S15 and all of the points $P(j)$ as the elements involved in the additional points set T in the STEP S10 are sorted in order. In detail, the elements in the additional points set T are set as a point $P\tau(0)$, a point $P\tau(1)$, . . . , and a point $P\tau T(N-1)$ in order. In other words, the additional points set T is replaced as a N data series including the points $P\tau(0)$ to $P\tau(N-1)$. As shown in FIG. 5(a), the additional points set T includes the data series of N additional points having bigger thermal image value than the estimated thermal image values which are set on the line segments between each of the adjacent points among the maximum point $P\sigma(0)$ to the maximum point $P\sigma(M-1)$ selected in the first selection step.

In the interpolation step, linear interpolations are performed using the maximum points $P\sigma(0)$, $P\sigma(1)$, . . . $P\sigma(M-1)$ selected in the first selection step and the additional points $P\tau(0)$, $P\tau(1)$, . . . , $P\tau(N-1)$ selected in the second selection step as shown in STEPS S16 and S17 as follows.

In the STEP S16, the maximum points set S and the additional points set T are summed to generate a selected points set W, the elements of which are points $P\omega(0)$, $P\omega(1)$, . . . $P\omega(M+N-1)$ in order. That is, the selected points set W are defined as M+N data series including the data from $P\omega(0)$ to $P\omega(0) P\omega(M+N-1)$. As shown in FIG. 5(b), the data series of the selected points set W are the set of the maximum points selected in the first selection step and the additional points selected in the second selection step.

In the STEP S16, among the position coordinates 0 to L-1, (L-(M+N)) data series are generated between each adjacent two of the selected points set W by the linear interpolation. More specifically, in the first and second selection steps, (M+N) data series are selected, so that the initial number L of the data series is reduced. In other words, the thermal image values smaller than the estimated thermal values set as the values on the line between the adjacent maximum points are removed from the thermal image values as the unexpected values. Thus, so as to avoid absence of data in the position coordinates, as shown in FIG. 6(a), the data series of the number of (L-(M+N)) that are not selected in the first and second selection steps are newly generated in that position coordinates, where the thermal image values are removed, among the maximum points selected in the first selection step and the additional points selected in the second selection step. As the result of that, the newly generated thermal image values in the data series become the thermal image values in the position coordinates on the lines between each adjacent two of the selected points set W.

As described above, the removal step, which is included in the thermal-image smoothing method carried out in the present embodiment, includes the first selection step for selecting the maximum points where the thermal image values are maximum from the data series of the temperature profile data of the thermal image values; the second selection step for selecting the additional points where the thermal image values are bigger than the estimated values which are on the lines formed between the adjacent maximum points;

and the interpolation step for performing the linear interpolation using the maximum points and the additional points.

Due to the structure of the embodiment, even if there occur the cracks C in the film of the black body coating B as shown in FIG. 2(a), the thermal image produced on the basis of the thermal image values of the work W can be smoothed in a proper way, thereby measuring accurately the surface temperature distribution of the work. The thermal image values smaller than the estimated values set on the lines between the adjacent maximum points are removed as the unexpected values from the thermal image values, and therefore the influence of lowering the amount of infrared light at the cracks can be eliminated. As a result, there is no linear pattern due to the cracks C on the thermal image D as shown in FIG. 2(b) in the thermal image generated on the basis of the measured thermal image values of the work W having the cracks on the film of the black body coating B. In short, even if the film of the black body coating B has the cracks C, the product accuracy of the thermal image D can be maintained.

The removal step in the thermal-image smoothing method can be repeated. In this embodiment, after the first removal step in the smoothing process, the second removal step is carried out, wherein the first selection step, the second selection step and the interpolation step are included.

More specifically, as shown in FIG. 6(b), the data of the position coordinate j after the first smoothing process is set as a point Q(j). For the L data series including the points Q(0) through Q(L−1), the smoothing process is carried out in the same way of the first smoothing process.

As shown in FIG. 6(b), maximum points Qσ(0), Qσ(1), ... Qσ(m−1) where the thermal image values are the maximum are selected. As shown in FIG. 7(a), additional points Qτ(0), Qτ(1), ..., Qτ(n−1) of number n where the thermal image values are bigger than estimated values on the lines formed between the adjacent maximum points Qσ(0), Qσ(1), ... Qσ(m−1) are selected as a data series of the additional points set T. The elements of the selected points set W are set as points Qω(0), Qω(1), ..., Qω(m+n−1) in order. After that as shown in FIG. 7(b), the (L−(m+n)) data series that are not selected in the first and second selection steps are newly generated among the maximum points selected in the first selection step and the additional points selected in the second selection step.

As described above, the removal steps are carried out repeatedly, so that the influence of lowering the amount of infrared light in the cracks can be eliminated more efficiently as shown in FIG. 7(b). As a result, setting the repeat number for the removal step properly makes the degree of eliminating the influence by the cracks adjusted. That is, the thermal image can be produced with desired accuracy.

Regarding the smoothing process for the temperature profile data of the thermal image values, the thermal image values are sorted to row data and column data based on the position in the work W, and the removal steps are performed on the row data and the column data.

As shown in FIG. 2(a), not only the horizontal lines Lh but also vertical lines Lv are set, and the processing including the smoothing step is performed on the temperature profile data of the thermal image values on each of the horizontal lines Lh and vertical lines Lv.

As described above, the smoothing step is performed on the temperature profile data of the thermal image values on each of the horizontal lines Lh and vertical lines Lv, so that the thermal image can be smoothed more properly that is produced based on the measured thermal image values of the work W. More specifically, if the cracks C occur in the film of the black body coating B in the horizontal direction, as the smoothing process is performed on the temperature profile data of the thermal image values along the vertical lines Lv perpendicular to the cracks C, the influence of the horizontal cracks C can be eliminated. That is, in the case that the occurring directions of the cracks C are the same as the horizontal line Lh or vertical line Lv, it is difficult to eliminate the influence of the cracks, however, the smoothing process along the vertical lines Lv or horizontal lines Lh which are perpendicular to the occurring directions of the cracks makes the influence of the cracks C eliminated, and therefore the production accuracy of the thermal image D can be maintained without lowering the accuracy.

Industrial Applicability

The present invention related to a smoothing method for a thermal image, a surface-temperature measuring method and a surface-temperature measuring apparatus is configured to eliminate the influence of lowering the infrared light in the crack portion occurred in the film of the black body coating, thereby smoothing the thermal image produced based on the thermal image values measured to the work and measuring the distribution of the surface temperature with accuracy. Therefore, the present invention is industrially useful when the infrared light emitted from the work is detected so as to measure the surface temperature of the work.

The invention claimed is:

1. A method for smoothing a thermal image produced based on thermal image values of a work to be measured on which a black body coating is applied, comprising:
    a removal step for removing thermal image values which are smaller than an estimated value from the thermal image values of the work as unexpected values,
    wherein the removal step comprises:
    a first selection step for selecting local maximum points whose thermal image values are maximal from the thermal image values;
    a second selection step for selecting additional points having bigger thermal image values than the estimated value, which is set on a line between each two of the adjacent local maximum points selected in the first selection step; and
    an interpolation step for replacing the thermal image values between the local maximum points selected in the first selection step and the additional points selected in the second selection step, removed as the unexpected values in the removal step, by performing a linear interpolation using the local maximum points selected in the first selection step and the additional points selected in the second selection step.

2. The method according to claim 1,
    wherein the removal step is repeated.

3. The method according to claim 1,
    wherein the thermal image values are sorted to row data and column data based on a position in the work, and the thermal image values in the row data and in the column data are used in the removal step.

4. A method for measuring a surface temperature comprising the method according to claim 1.

5. An apparatus for measuring a surface temperature comprising a processor for carrying out the method according to claim 1.

6. The method according to claim 2,
    wherein the thermal image values are sorted to row data and column data based on a position in the work, and the thermal image values in the row data and in the column data are used in the removal step.

7. A method for measuring a surface temperature comprising the method according to claim 2.

8. A method for measuring a surface temperature comprising the method according to claim 3.

9. A method for measuring a surface temperature comprising the method according to claim 6.

10. An apparatus for measuring a surface temperature comprising a processor for carrying out the method according to claim 2.

11. An apparatus for measuring a surface temperature comprising a processor for carrying out the method according to claim 3.

12. An apparatus for measuring a surface temperature comprising a processor for carrying out the method according to claim 6.

* * * * *